United States Patent [19]

Fujikawa et al.

[11] Patent Number: 5,385,995

[45] Date of Patent: Jan. 31, 1995

[54] PROCESS FOR THE PREPARATION OF AN ALKYL VINYL ETHER/MALEIC ANHYDRIDE COPOLYMER

[75] Inventors: Hisao Fujikawa; Hideo Katsui, both of Otake; Hiroshi Ogawa, Himeji, all of Japan

[73] Assignee: Daicel Chemical Industries, Ltd., Tokyo, Japan

[21] Appl. No.: 906,410

[22] Filed: Jul. 1, 1992

[51] Int. Cl.$^6$ .................. C08F 2/06; C08F 222/06; C08F 216/12

[52] U.S. Cl. .................. 526/216; 526/271; 526/332

[58] Field of Search .................. 526/216, 271, 332

[56] References Cited

U.S. PATENT DOCUMENTS

| | | | |
|---|---|---|---|
| 2,782,182 | 2/1957 | Verburg | 260/78.5 |
| 3,030,343 | 4/1962 | Jones | 260/78.5 |
| 3,499,876 | 3/1970 | Field et al. | 260/78.5 |
| 3,532,771 | 10/1970 | Field et al. | 260/87.5 |
| 3,553,183 | 1/1971 | Field et al. | 260/78.5 |
| 3,632,561 | 1/1972 | Gibb et al. | 260/78.5 |
| 4,370,454 | 1/1983 | Messmer et al. | 526/88 |
| 4,532,320 | 7/1985 | Denzinger et al. | 528/498 |
| 4,900,809 | 2/1990 | Tazi et al. | 528/497 |
| 4,948,848 | 8/1990 | Tazi et al. | 526/78 |
| 4,952,558 | 8/1990 | Goertz et al. | 526/27.1 |
| 4,992,517 | 2/1991 | Tazi et al. | 526/209 |
| 5,008,355 | 4/1991 | Tazi | 526/271 |
| 5,047,490 | 9/1991 | Pehlah et al. | 526/271 |
| 5,082,913 | 1/1992 | Tazi et al. | 526/272 |

FOREIGN PATENT DOCUMENTS

| | | |
|---|---|---|
| 145714 | 11/1980 | Japan . |
| 204910 | 8/1989 | Japan . |
| 204911 | 8/1989 | Japan . |
| 204912 | 8/1989 | Japan . |
| 906230 | 9/1962 | United Kingdom . |

*Primary Examiner*—Joseph L. Schofer
*Assistant Examiner*—Wu C. Chang
*Attorney, Agent, or Firm*—Morgan & Finnegan

[57] ABSTRACT

An improved process for the preparation of an alkyl vinyl ether/maleic anhydride copolymer in which copolymerization is carried out in an admixture of an ester and an hydrocarbon.

The alkyl vinyl ether/maleic anhydride copolymer obtained by this process does not contain any harmful aromatic solvent such as benzene, etc. In addition, the alkyl vinyl ether/maleic anhydride copolymer has a higher apparent bulk density than can be obtained in prior processes.

11 Claims, No Drawings

PROCESS FOR THE PREPARATION OF AN ALKYL VINYL ETHER/MALEIC ANHYDRIDE COPOLYMER

FIELD OF THE INVENTION

The present invention relates to a process for the preparation of an alkyl vinyl ether/maleic anhydride copolymer wherein the process does not include the use of a harmful solvent, and wherein the copolymer produced has a higher apparent bulk density.

In particular, the present invention relates to a process for the preparation of an alkyl vinyl ether/maleic anhydride copolymer, such process not including an aromatic solvent such as benzene which is harmful to the human body.

BACKGROUND OF THE INVENTION

An alkyl vinyl ether/maleic anhydride copolymer is a copolymer-anhydride having a linear molecular structure and a water-soluble high molecular weight electrolyte copolymer compound which has been used as, for example, surface active compounds, a component of glass cleaners, a component of additives to builders for a detergent, and as sequestering agents themselves.

In particular, methyl vinyl ether/maleic anhydride copolymer has recently been used as a component of water-soluble additives to agents to be coated on a sticking plaster (e.g., under the name "Pappu-zai" in Japan) by mixing with endermic liniments and glues because of the copolymer having an excellent non-toxic property with respect to the human body, an excellent chemical stability for a long period of time, an excellent stickiness, an aggregating ability, a water absorbing ability, restrippability, etc.

Furthermore, copolymers in which maleic anhydride units are partially or completely ring-opened with water, alkalis, or various alcohols, are also widely applied as thickening additives for water soluble materials, components of additives to adhesives, an anti-sticking additives to detergents, and components of additives to spray-type fixing agents for human hairs.

Hitherto, it is well known that an alkyl vinyl ether/maleic anhydride copolymer has been produced by free radical copolymerization of an alkyl vinyl ether monomer with maleic anhydride monomer in the presence of a free radical catalyst and in the absence of molecular oxygen at temperatures of from 40° to 120 ° C. in organic solvents.

Sedimentation polymerization in which the reaction is carried out in the presence of a solvent capable of dissolving maleic anhydride which is a starting material, and incapable of dissolving an alkyl vinyl ether/maleic anhydride copolymer is also known.

Furthermore, a process such as the solution polymerization in which the reaction is carried out in the presence of a solvent capable of dissolving both of maleic anhydride which is a starting material and an alkyl vinyl ether/maleic anhydride copolymer is known.

For example, the sedimentation polymerization in benzene which is an aromatic hydrocarbon, is disclosed in U.S. Pat. Nos. 2,782,182, 3,030,343, 3,499,876, 3,532,771, 3,553,183 and 4,900,809, DE 3302495 and Japanese Examined Patent Publication (Kokoku) No. 29193/1970 and Japanese Unexamined Patent Publication (Kokai) Nos. 204910, 204911 and 204912 / 1989, etc.

U.S. Pat. Nos. 3,499,876, 3,532,771, 3,553,183, DE 3302495 and Japanese Unexamined Patent Publication (Kokai) Nos. 204910, 204911 and 204912 / 1989 disclose also the use of toluene and xylene which are aromatic hydrocarbons.

Furthermore, U.S. Pat. No. 3,532,771 also discloses the use of hexane, heptane and nonane which are an aliphatic hydrocarbons.

Still further, U.S. Pat. No. 3,499,876, DE 3302495 and GB 1117515 disclose the use of dichloroethane which is an halogenated aliphatic hydrocarbon.

DE 3302495 discloses the use of trichloroethane or carbon tetrachloride which is an halogenated aliphatic hydrocarbon.

In addition, there are disclosed the use of an admixture composed of 1,1,2-trichloro-1,2,2-trifluoroethane and dichloromethane in Japanese Unexamined Patent Publication (Kokai) No. 145714/1980; the use of an ester compound having the carbon number of 51 in DE 3736996; the use of methyl acetate, ethyl acetate, isopropyl acetate and or methyl propionate in Japanese Unexamined Patent Publication (Kokai) Nos. 204910-204912/1988; the use of an allyl vinyl ether in GB 906230, DE 3712265 and DE 3108100; and the use of a sterically hindered monoether in WO 9012817.

On the other hand, examples of the solution polymerization using methyl acetate or ethyl acetate are disclosed in U.S. Pat. NO. 4948848, using acetone in U.S. Pat. Nos. 3499876 and 4948848, and using methyl ethyl ketone in U.S. Pat. No. 3499876.

However, when conventional solvents which are harmful to the human body such as benzene, toluene, xylene, carbon tetrachloride, dichloroethane, trichloroethane, etc., are used in the reaction, it has been difficult to economically reduce the residual solvent in the product to zero, even though being-carefully dried in the drying step after the completion of the reaction.

As described hereinabove, an alkyl vinyl ether/maleic anhydride copolymer is often used as a component in a detergent which directly contacts with the human body (particularly, skin).

However, the above reaction methods using harmless solvents also have the disadvantages as described below.

For example, in the case of the reaction using an ester compound such as methyl formate, isopropyl acetate, butyl acetate and or methyl propionate, etc., the resulting copolymer readily adheres to the inside of the reaction vessel during reacting, resulting in a problem of handling.

In the case of the reaction by the solution polymerization using methyl acetate, ethyl acetate, acetone and or methyl ethyl ketone, etc., a considerably large amount of energy is required on removing the solvent as compared with sedimentation polymerization. Furthermore, in the case of the method using an expensive solvent such as an admixture composed of 1,1,2-trichloro-1,2,2-trifluoroethane and dichloromethane, a sterically hindered monoether compound or an allyl vinyl ether, etc., there is a problem from the viewpoint of cost, because of a certain extent of the unavoidable loss on removing the solvents.

Still further, the conventional methods, particularly in the case of carrying out the reaction using benzene, can only provide copolymer having a lower bulk density, which results in inefficient shipping.

Accordingly, there is a need for the development of a method in which a copolymer having a higher bulk density can be prepared.

In view of these objections, and as a result of extensive investigations, the present inventors have now completed the present invention.

SUMMARY OF THE INVENTION

It is a primary object of the present invention to provide an alkyl vinyl ether/maleic anhydride copolymer which is harmless to the human body.

Another object of the present invention is to provide a process for the preparation of a copolymer in which an economical solvent is used resulting in copolymer which does not adhere to the internal portion of the reaction vessel during the reaction, and further a copolymer having a higher bulk density.

DETAILED DESCRIPTION OF THE INVENTION

The present invention is now described hereinafter in more detail. The reaction for preparing an alkyl vinyl ether/maleic anhydride copolymer may be represented by the golloeinh equation:

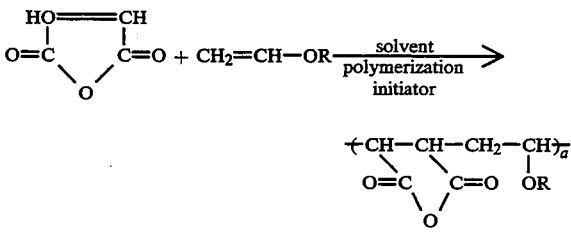

wherein n is from 10 to 100,000, and can be adjusted by controlling the charged amount of initiating agents for the polymerization reaction, the charging speed of methyl vinyl ether monomer, polymerization temperatures, and/or the charging amount of a chain transfer initiator, and R is a linear or branched aliphatic and or elicyclic alkyl group having a carbon number of preferably from 1 to 4.

The copolymerization in the present invention, can be carried out by a continuous process or a semi-batchwise process, in which maleic anhydride which is one of starting monomers is firstly charged into a reaction vessel and then a radical polymerization initiator and an alkyl vinyl ether are continuously or intermittently charged during the reaction.

In the case of the sedimentation polymerization, the resulting alkyl vinyl ether/maleic anhydride copolymer precipitates with the progress of the reaction.

Accordingly, a product can be obtained by separating the copolymer and the solvents by filtering and then drying the copolymer.

The present invention is characterized in the use of an admixture composed of a carboxylic ester and an aliphatic saturated hydrocarbon as a solvent in the sedimentation polymerization.

The carboxylic ester used in the present invention is an ester composed of a lower saturated aliphatic carboxylic acid and a saturated monovalent alcohol.

The lower saturated aliphatic carboxylic acids include formic acid, acetic acid, propionic acid, butyric acid, etc., and the saturated monovalent alcohols include a linear or branched aliphatic or allcyclic alcohol having a carbon number of 1 to 5.

The preferred carboxylic esters specifically includes methyl formate, ethyl formate, n-propyl formate, isopropyl formate, n-butyl formate, isobutyl formate, tert-butyl formate, sec-butyl formate, various isomers of pentyl formate, methyl acetate, ethyl acetate, n-propyl acetate, isopropyl acetate, n-butyl acetate, isobutyl acetate, tert-butyl acetate, sec-butyl acetate, various isomers of pentyl acetate, methyl propionate, ethyl propionate, n-propyl propionate, isopropyl propionate, n-butyl propionate, isobutyl propionate, tert-butyl propionate, sec-butyl propionate, various isomers of pentyl propionate, methyl butylate, ethyl butylate, n-propyl butylate, isopropyl butylate, n-butyl butylate, isobutyl butylate, tert-butyl butylate, sec-butyl butylate, various isomers of pentyl butylate, etc.

The hydrocarbon used in the present invention includes linear or branched aliphatic or allcyclic hydrocarbons having a carbon number of 5 to 10.

The preferred hydrocarbons include n-pentane, n-hexane, n-heptane, n-octane, n-nonane, n-decane and various isomers thereof.

Mixing ratio range of the carboxylic ester with respect to the aliphatic saturated hydrocarbon is generally from about 90/10 to about 40/60, preferably from about 80/20 to about 50/50.

Where the mixing ratio is more than 90/10, the resulting copolymer tends to adhere to the reaction vessel during the reaction, and it becomes difficult to take out a reaction crude liquid from the reaction vessel after the completion of the reaction.

On the other hand, where the mixing ratio is less than 40/60, the starting monomers unpreferably tend to not dissolve in the mixed solvent.

In succession, the other conditions of the copolymerization are described below.

An alkyl vinyl ether to be used in the present invention is represented by the following general formula:

wherein, R is an aliphatic or allcyclic alkyl group having a linear or branched chain.

It specifically includes methyl vinyl ether, ethyl vinyl ether, n-propyl vinyl ether, isopropyl vinyl ether, tert-butyl vinyl ether and sec-butyl vinyl ether, etc.

The copolymerization reaction may be carried out either at ordinary pressures or at pressurized conditions in a closed vessel.

The reaction temperatures range is generally from about 40° to 120° C. through which a radical polymerization can be carried out, preferably from about 40° to 90° C. depending upon the mixing ratio of the carboxylic ester which dissolves the copolymer with respect to the aliphatic saturated hydrocarbon.

Although various polymerization initiators can be used, an organic peroxide or an azo-compound is generally used because of the ease of handling.

The reactivity of the polymerization initiator is generally shown by its half-value period.

There are preferably used polymerization initiators having the 1-hour-half-value period of from about 60° to 100° C.

Where the 1-hour-half-value period of the polymerization initiator is lower than 60° C., careful handling of the initiator is required, for example, careful storing such as under cooling or icing.

On the other hand, where the 1-hour-half-value period of the initiator is higher than 100 °C., the decomposition velocity is too slow requiring an unpractically long period under the suitable temperature range for the polymerization of the alkyl vinyl ether/maleic anhydride copolymer.

Specific examples of initiators having the 1-hour-half-value period range of from about 60° to 100 °C. include benzoyl peroxide, 4-chloro benzoyl peroxide, 2,4-dichloro benzoyl peroxide, 2-methylbenzoyl peroxide, octanoyl peroxide, decanoyl peroxide, lauroyl peroxide, stearoyl peroxide, t-butyl peroxy-pivalate, t-butyl peroxy-2-ethyl hexanate, t-butyl peroxy isobutylate, bis(2-ethylhexyl)peroxydicarbonate, diisopropyl peroxy-dicarbonate, di-sec-butyl peroxydicarbonate, diisopropyl benzene hydroperoxide, 2,2'-azobisisobutyl nitryl, 2,2'-azobis-2,4-dimethyl varelo nitryl and 2,2'-azobis-4-methoxy-2,4-dimethyl varelo nitryl.

In the case of continuously charging the polymerization initiator during the reaction, its charging speed is preferably from about 0.01 to 3.0 milli mol/(hr-mol number of maleicanhydride) depending upon the target molecular weight of the alkyl vinyl ether/maleic anhydride copolymer, the kind of the polymerization initiator, the chain transfer coefficient of the polymerization initiator or a living radical with respect to a reaction solvent, and the mixing ratio of the solvents, etc. Where the charging speed is continuously not more than 0.01, the reaction period becomes long, resulting in a lower productivity.

On the other hand, where it is continuously more than 3.0, the amount of the residual initiator in a product becomes unpreferably large.

Furthermore, it is more preferable that the addition of the polymerization initiator is not discontinued until a step before 2 or 3 hours of the completion of the polymerization reaction.

Still further, according to circumstances, the fixed amounts of the polymerization initiator may be charged by a lump addition at the initiation of the reaction, and then the charging speed of from about 0.01 to 3.0 milli mol/(hr-mol number of maleic anhydride) may be maintained.

In the case of continuously charging the alkyl vinyl ether during the reaction, its charging speed is generally from about 0.01 to 1.0 mol/(hr-mol number of maleic anhydride), preferably from about 0.02 to 0.3 depending upon the target molecular weight of the alkyl vinyl ether/maleic anhydride copolymer, the kind of the polymerization initiator, the chain transfer coefficient of the polymerization initiator or a living radical with respect to a reaction solvent, and the mixing ratio of the solvents, etc.

Where the charging speed is not more than 0.01, the reaction period becomes long, resulting in a lower productivity.

On the other hand, where it is more than 1.0, it is not preferable from the viewpoint of economy because of an increase in the amounts of the alkyl vinyl ether which does not contribute to the reaction and only vaporizes from the liquid surface.

Progress of the polymerization reaction can be monitored by the residual concentration of maleic anhydride with a gas chromatography analysis.

There can be actually confirmed the molecular weight of the alkyl vinyl ether/maleic anhydride copolymer in the present invention by a specific viscosity measured in methyl ethyl ketone.

The measuring method of the specific viscosity is specifically described below.

The methyl ethyl ketone solution containing 1% (based on weight/volume, 25° C.) of the copolymer is prepared, and then there is measured the falling time at 25° C. with a capillary tube viscometer specified in JIS K6726 and the specific viscosity value is calculated by the following equation:

Specific Viscosity = $(A-B)/B$ wherein, A is a falling time measured in relation to the solution of the copolymer and B is a falling time measured in relation to the methyl ethyl ketone.

It is noted that the specific viscosity value increases with an increase of the molecular weight in regard to a polymer having identical structural units, therefore generally, the specific-viscosity is widely used an index which is relatively represented in regard to the molecular weight of the polymer.

After the completion of the copolymerization, the copolymer is taken out of the reaction vessel as it is in slurry state, and then it is filtered and dried, resulting in a copolymer product which is dried and white-colored powders and/or fine granules.

In the following, the process of the present invention is described by Examples and Comparative Examples below.

The reaction was completed within a fixed period and maleic anhydride was not detected in the reaction products obtained in all of the Examples.

EXAMPLE 1

A 5 liter reaction vessel equipped with a stirrer, a reflux condenser and a unit for controlling internal temperatures was charged with 188 g of maleic anhydride and 2489 g of an admixture composed of ethyl acetate and n-heptane with a mixing ratio of 80/20 by weight to dissolve each other, followed by maintaining the internal temperature at 76° C.

Successively, there was continuously charged 400 milli liter of an admixture composed of ethyl acetate and n-heptane with a mixing ratio of 80/20 by weight containing 0.51 g of lauroyl peroxide with a charging speed of 50 milli liter/hour [corresponding to 0.075 milli mol(hr-mol number of maleic anhydride)].

And, methyl vinyl ether was continuously charged in the bottom portion of the reaction vessel with a charging speed of 90 milli liter/hour until the completion of the reaction.

The reaction vessel was cooled to obtain a slurry state product, after the reaction was continued 7.3 hours.

Adhering was not observed during the reaction.

Mixed solvents were removed from the slurry state product to obtain a white-colored powder state copolymer.

The bulk density of the copolymer obtained was 0.35 g/milli liter.

COMPARATIVE EXAMPLE 1

The same procedures as described in Example 1 were repeated, except that 2480 g of benzene were used in place of 2480 g of the admixture composed of ethyl acetate/n-heptane as a solvent.

A copolymer having the specific viscosity of 3.47 was obtained after the reaction was continued for 3.5 hours.

The bulk density of the copolymer obtained was 0.25 g/milli liter.

EXAMPLE 2

The same procedures as described in Example 1 were repeated, except that 0.91 g of lauroyl peroxide was used.

A copolymer having the specific viscosity of 2.03 was obtained after the reaction was continued for 4.5 hours.

The bulk density of the copolymer obtained was 0.37 g/milli liter.

EXAMPLE 3

A 5 liter reaction vessel equipped with a stirrer, a reflux condenser and a unit for controlling internal temperatures was charged with 377 g of maleic anhydride and 2202 g of an admixture composed of ethyl acetate and n-heptane with a mixing ratio of 60/40 by weight to dissolve each other, followed by-maintaining the internal temperature at 82° C.

Successively, there was continuously charged 400 milli liter of an admixture composed of ethyl acetate and n-heptane with a mixing ratio of 68/40 by weight containing 2.74 g of lauroyl peroxide with a charging speed of 50 milli liter/hour [corresponding to 0.22 milli mol(hr-mol number of maleic anhydride)].

And, methyl vinyl ether was continuously charged in the bottom portion of the reaction vessel with a charging speed of 180 milli liter/hour until the completion of the reaction.

The reaction vessel was cooled to obtain a slurry state copolymer, after the reaction was continued 7 hours.

Mixed solvents were removed from the slurry state product to obtain a white-colored powder state copolymer.

The specific viscosity of the copolymer was 2.74.

And, the bulk density of the copolymer obtained was 0.27 g/milli liter.

EXAMPLE 4

A 5 liter reaction vessel equipped with a stirrer, a reflux condenser and a unit for controlling internal temperatures was charged with 188 g of maleic anhydride and 2489 g of an admixture composed of methyl formate and n-pentane with a mixing ratio of 80/20 by weight to dissolve each other, followed by maintaining the internal temperature at 80° C.

Successively, there was continuously charged 400 milli liter of an admixture composed of methyl formate and n-pentane with a mixing ratio of 80/20 by weight containing 0.91 g of lauroyl peroxide with a charging speed of 50 milli liter/hour [corresponding to 0.15 milli mol(hr-mol number of maleic anhydride)].

And, methyl vinyl ether was continuously charged in the bottom portion of the reaction vessel with a charging speed of 90 milli liter/hour until the completion of the reaction.

The reaction vessel was cooled to obtain a slurry state product, after the reaction was continued 6 hours.

Mixed solvents were removed from the slurry state product to obtain a white-colored powder state copolymer.

The specific viscosity of the copolymer was 2.88.

And, the bulk density of the copolymer obtained was 0.34 g/milli liter.

EXAMPLE 5

A 5 liter reaction vessel equipped with a stirrer, a reflux condenser and a unit for controlling internal temperatures was charged with 188 g of maleic anhydride and 2489 g of an admixture composed of n-pentyl butylate and n-decane with a mixing ratio of 80/20 by weight to dissolve each other, followed by maintaining the internal temperature at 80° C.

Successively, there was continuously charged 400 milli liter of an admixture composed of n-pentyl butylate and n-decane with a mixing ratio of 80/20 by weight containing 0.91 g of lauroyl peroxide with a charging speed of 50 milli liter/hour [corresponding to 0.15 milli mol(hr-mol number of maleic anhydride)].

And, methyl vinyl ether was continuously charged in the bottom portion of the reaction vessel with a charging speed of 90 milli liter/hour until the completion of the reaction.

The reaction vessel was cooled to obtain a slurry state product, after the reaction was continued 6 hours.

Mixed solvents were removed from the slurry state product to obtain a white-colored powder state copolymer.

The specific viscosity of the copolymer was 3.00.

And, the bulk density of the copolymer obtained was 0.37 g/milli liter.

EXAMPLE 6

The same procedures as described in Example 1 were repeated, except that n-butyl vinyl ether was used as an alkyl vinyl ether.

A copolymer having the specific viscosity of 3.47 was obtained after the reaction was continued 5.5 hours.

And, the bulk density of the copolymer obtained was 0.35 g/milli liter.

While the invention has been described in detail and with reference to specific embodiments thereof, it will be apparent to one skilled in the art that various changes and modifications can be made therein without departing from the spirit and scope thereof.

We claim:

1. In a process for the preparation of an alkyl vinyl ether/maleic anhydride copolymer by copolymerizing an alkyl vinyl ether with maleic anhydride, the improvement which comprises conducting the copolymerization in a solvent admixture comprising an ester and a hydrocarbon linear or branched aliphatic.

2. A process according to claim 1, wherein the ester is an ester of a lower saturated aliphatic carboxylic acid and a saturated monovalent alcohol.

3. A process according to claim 1, wherein the mixing ratio range of ester to hydrocarbon is from about 90/10 to about 40/60.

4. A process according to claim 1, wherein the copolymerization is carried out in the presence of a polymerization initiator.

5. A process according to claim 1, wherein the ester is an ester of formic acid, acetic acid, propionic acid or butyric acid and a linear or branched aliphatic or allcyclic alcohol having 1 to 5 carbon atoms.

6. A process according to claim 1, wherein the ester is methyl formate, ethyl formate, n-propyl formate, isopropyl formate, n-butyl formate, isobutyl formate, tert-butyl formate, sec-butyl formate, various isomers of pentyl formate, methyl acetate, ethyl acetate, n-propyl acetate, isopropyl acetate, n-butyl acetate, isobutyl acetate, tert-butyl acetate, sec-butyl acetate, various isomers of pentyl acetate, methyl propionate, ethyl propionate, n-propyl propionate, isopropyl propionate, n-butyl propionate, isobutyl propionate, tertbutyl propionate, sec-butyl propionate, various isomers of pentyl propionate, methyl butylate, ethyl butylate, n-propyl butylate, isopropyl butylate, n-butyl butylate, isobutyl butylate, tert-butyl butylate, sec-butyl butylate or various isomers of pentyl butylate.

7. A process according to claim 1, wherein the hydrocarbon has 5 to 10 carbon atoms.

8. A process according to claim 1, wherein the hydrocarbon comprises n-pentane, n-hexane, n-heptane, n-octane, n-nonane, n-decane and isomers thereof.

9. A process accounting to claim 1, wherein said solvent admixture comprises ethyl acetate and n-heptane.

10. A process according to claim 1, wherein said solvent admixture comprises ethyl acetate and n-hexane.

11. A process according to any one of claims 1, 2 or 3 to 10, wherein said alkyl vinyl ether is methyl vinyl ether.

* * * * *